Oct. 13, 1970  W. G. HORTON  3,533,179
DISPLAY DEVICES
Filed June 6, 1967  5 Sheets-Sheet 1
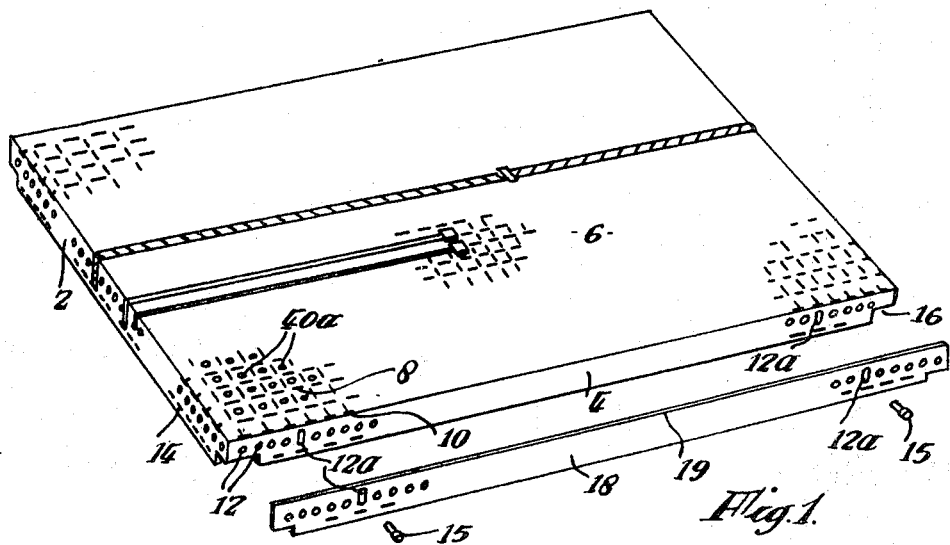
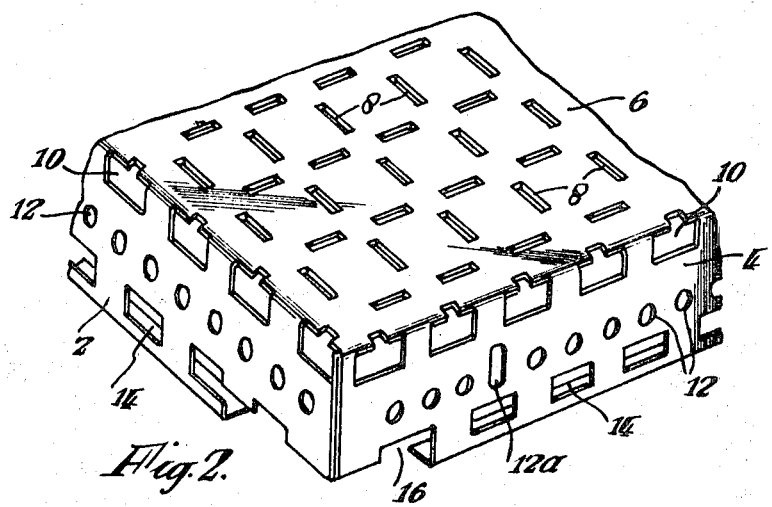
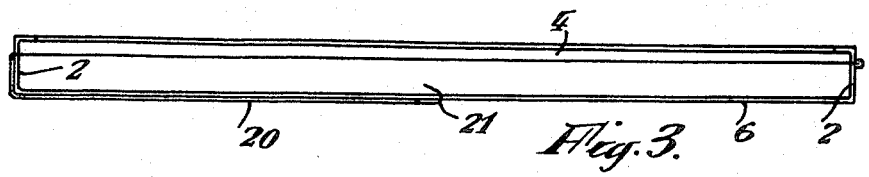
INVENTOR
WILLIAM GRAY HORTON
BY
ATTORNEYS Oct. 13, 1970 W. G. HORTON 3,533,179
DISPLAY DEVICES Filed June 6, 1967 5 Sheets-Sheet 2

INVENTOR
WILLIAM GRAY HORTON
BY
Pennie, Edmonds, Morton, Taylor & Adams
ATTORNEYS

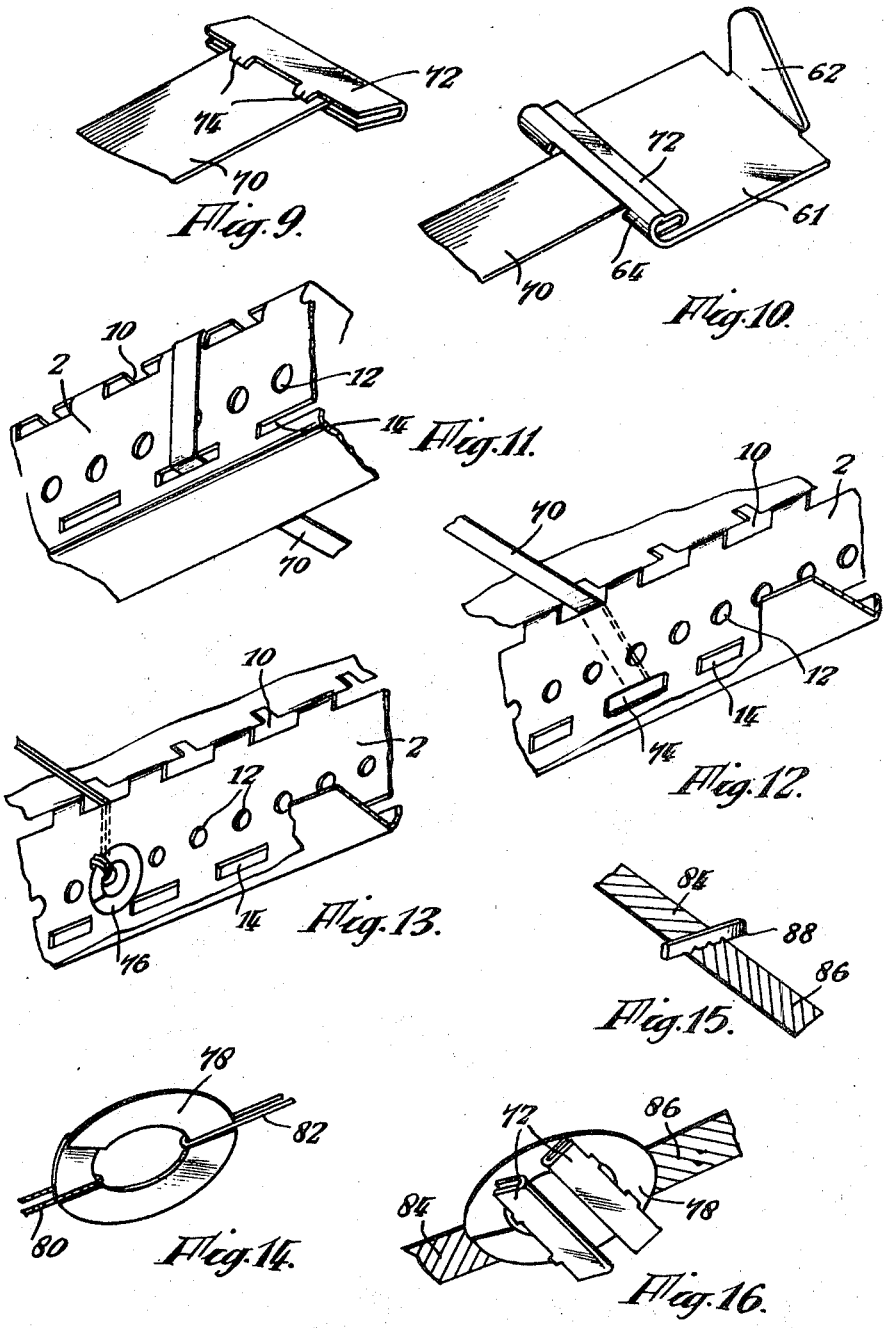

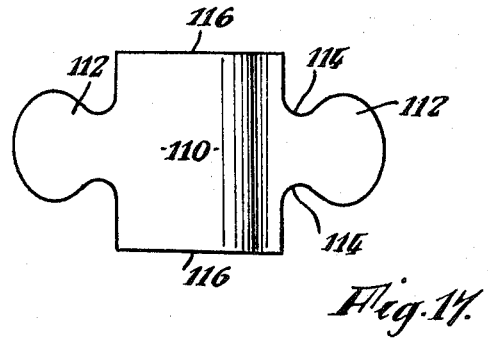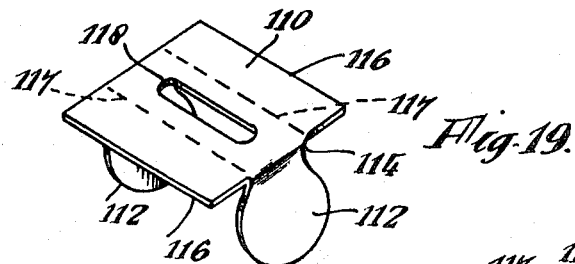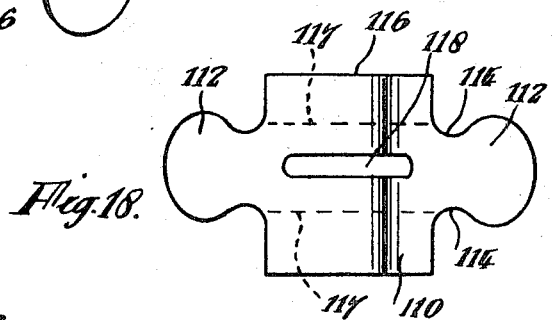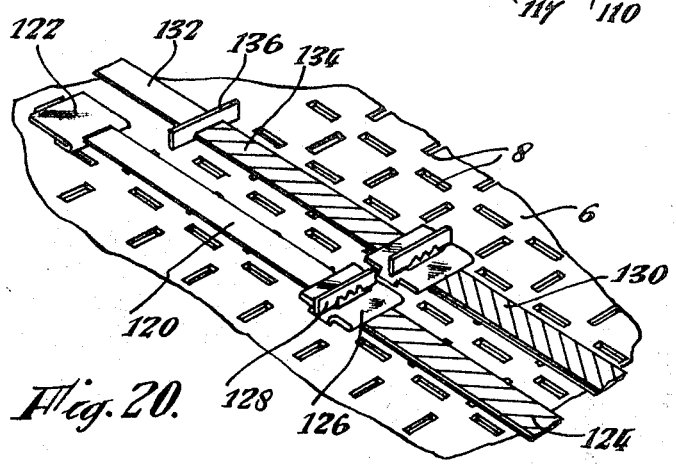

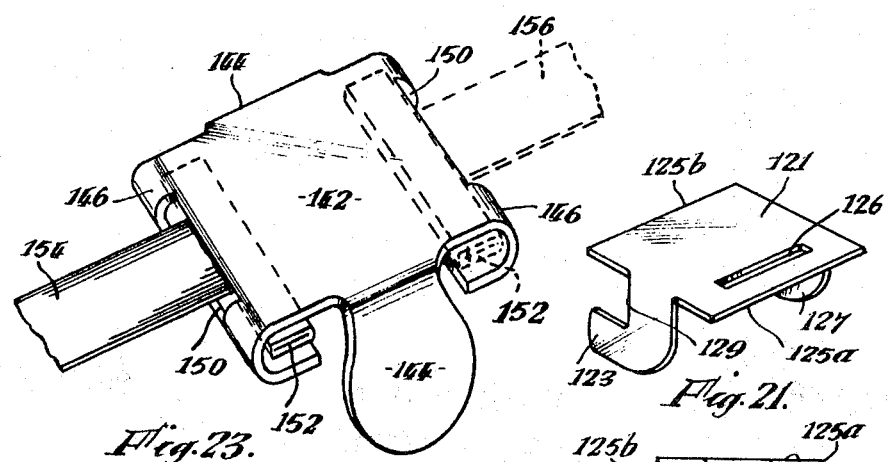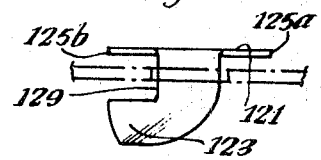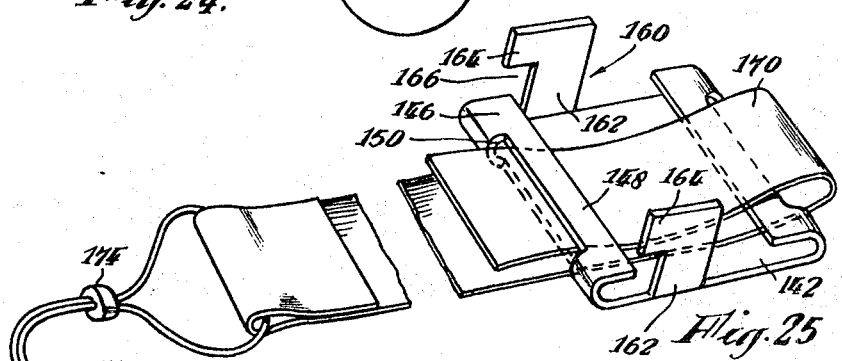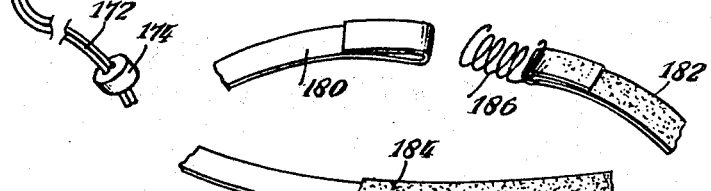

United States Patent Office 3,533,179
Patented Oct. 13, 1970

3,533,179
DISPLAY DEVICES
William Gray Horton, 36, Gloucester Square,
London, England
Continuation-in-part of application Ser. No. 549,417,
May 11, 1966. This application June 6, 1967, Ser.
No. 643,950
Int. Cl. G09f 9/00
U.S. Cl. 40—63                                                  19 Claims

ABSTRACT OF THE DISCLOSURE

The invention is concerned with the display of information, particularly in chart form, on display panels which have a grid of perforations to receive signal indicators. The invention is particularly directed to the provision of linear form signals in the form of cords or bands for the display panel and the adaptation of the panel to provide a satisfactory anchorage for such signals. The invention further provides novel anchorage elements by means of which the linear signals can be terminated at any desired position on the display grid and can overlie or overlap other such signals if required.

Figure 4:
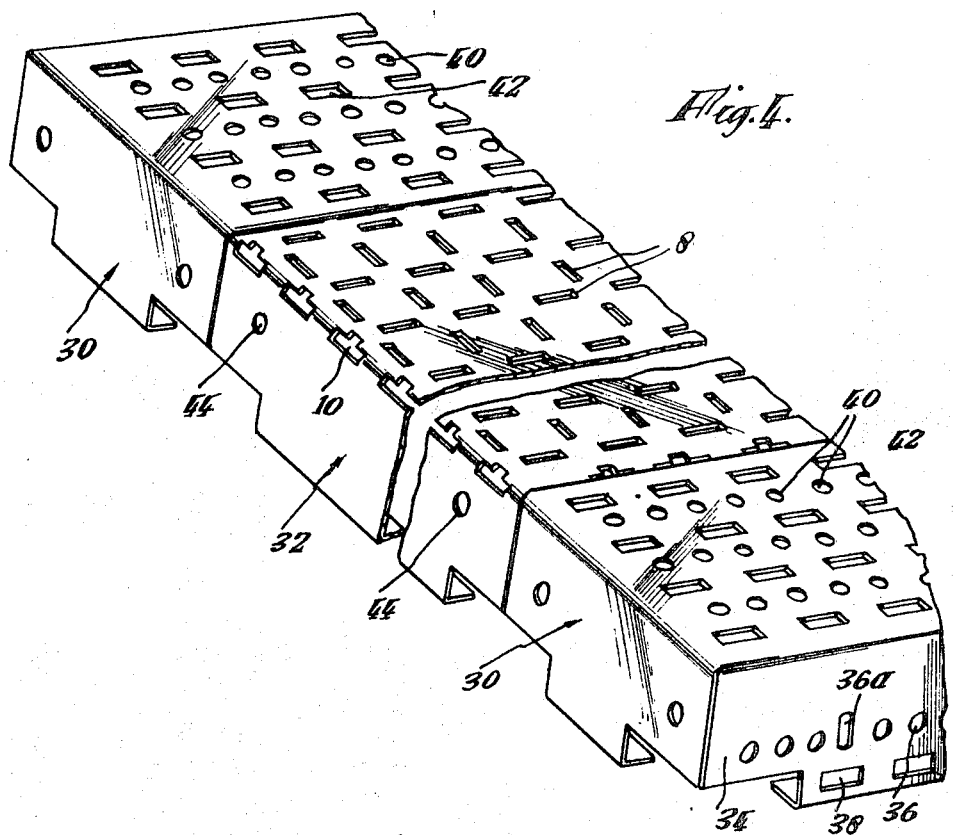

This application is a continuation-in-part application of my application Ser. No. 549,417, filed May 11, 1966, now abandoned.

This invention relates to the panel-form display of information, e.g. in the form of charts or graphs. It is particularly concerned with display panels having a front surface provided with regularly spaced perforations or like apertures in the form of a grid for the attachment of signal elements thereto (hereinafter referred to as "panels of the kind described").

One example of a panel of the kind described is disclosed in the specification of British Pat. No. 730,158 which describes a rectangular metal plate having rows of rectilinear slots mutually at right angles to define the lines of a grid of squares and to receive various forms of signals or indicator means. This prior specification also described how supplementary perforations may be provided at the centres of the grid squares to receive indicating devices in the form of pegs.

The present invention is concerned with extending the forms of display obtainable and so producing a more flexible presentation of information by the provision of mounting means for linear signals on a panel of the kind described and according to the invention such means take the form of at least one flange arranged to extend rearwardly from the front surface of the panel and having a series of apertures arranged in the form of at least one row to run parallel to one side of the grid but rearwardly spaced from the plane of the front surface, the pitch of said apertures being not greater than the module of the grid pattern along said side, the apertures being arranged to have a cord or band providing a linear signal passed through them. Preferably, there are at least two rows of apertures adjacent to each other, the apertures of one of said rows being of rounded form and those of the other of said rows being of elongated form with their axes directed parallel to the extent of the row.

The mounting means may be integral with the panel in which case there are preferably at least two series of said apertures of similar form and pitch, the respective series being disposed on opposite flanges extending rearwardly from the front face of the panel. Alternatively, said means may be provided on an auxiliary panel which will have attachment means whereby it can be secured to a panel of the kind described to project from an edge thereof.

The use of auxiliary panels may be dictated by the need to apply the invention to a main display panel of the prior art. In this case, the invention provides a combination of the main panel with at least one auxiliary panel arranged to be secured one side or (where two auxiliary panels are used) to opposite sides of the panel of the kind described so that the linear signals may extend between apertures in the main panel and the auxiliary panel or in the two auxiliary panels to appear upon the display face main panel.

Among the preferred features of the invention is the provision of novel ancillary attachment or signal elements to terminate a linear signal at any grid position on the front face of the panel. One preferred form of element has the form of a bridge, it consisting of a main body portion from opposite sides of which a pair of tabs project. Each tab has a recessed edge region adjacent said body portion to assist its retention in a grid perforation. Such attachment or signal elements are particularly advantageous where a linear signal is to terminate at a grid position through which another linear signal already passes.

To attach a linear signal other than on the face of a panel, however, a terminal attachment in the form of a protuberance on the end of the linear signal will usually be preferred. Such attachments may take the form of toggle pieces which can easily be slipped through the apertures of the mounting means when desired, or continuous or split rings which can easily be detached from the linear signals. Both these attachments means may be alternatively used to link together the ends of a linear signal into an endless cord or band but a preferred endless band arrangement uses non-elastic signal strips joined by a resilient tensioning element.

Figure 5:
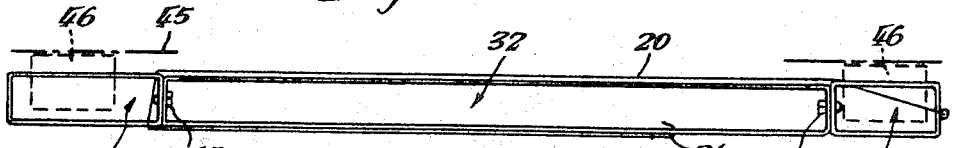
Figure 6:
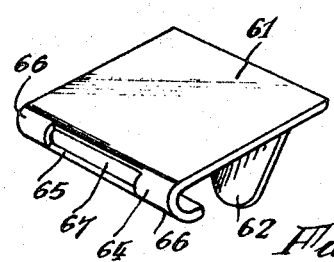
Figure 7:
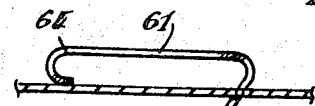
Figure 8:
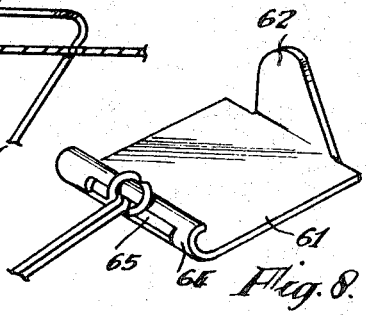

The invention will now be more particularly described with reference to the accompanying drawings wherein:

FIG. 1 is a perspective view of a panel having integrally formed in it means according to the invention, FIG. 2 is a more detailed view of a portion of the panel in FIG. 1, FIG. 3 is a schematic end view of the panel in FIGS. 1 and 2 showing the manner in which a linear signal is mounted to it, FIG. 4 is a perspective view of a portion of an assembly, according to the invention, of a main panel with two auxiliary panels, FIG. 5 is a schematic end view of the assembly of FIG. 4 showing how a linear signal extends between the auxiliary panels, FIGS. 6 to 8 are different views of an anchor piece for use with the present invention, FIG. 9 shows a toggle piece terminal attachment on a flat band signal, FIG. 10 illustrates how the attachment of FIG. 9 is mounted to an anchor piece, FIGS. 11 and 12 illustrate how a flat band extends to the rear of a panel and how its toggle piece termination may be hidden within the panel, FIG. 13 illustrates how a ring-form terminal attachment of a narrow cord may be similarly hidden, FIGS. 14 to 16 illustrate various ways in which bands or cords can be joined to each other, FIG. 17 shows a novel form of tabbed signal for use in combination with means according to the present invention, FIGS. 18 and 19 show alternative adaptations of the signal in FIG. 17 to provide bridge anchors for linear signals, FIG. 20 illustrates the use of the various anchors to secure linear signals, FIGS. 21 and 22 show a further form of tabbed signal in perspective and in side view respectively, FIGS. 23 and 24 show a further alternative form of tabbed signal in perspective and section respectively, FIG. 25 shows a signal element having a permanently attached indicator strip, and FIG. 26 shows an endless band indicator for use in combination with the arrangement shown in FIG. 25.

FIGS. 1 to 3 of the drawings illustrate a first form of panel incorporating the invention, this being of sheet metal and having rearwardly projecting side flanges 2 and top and bottom flanges 4 at the edges of front face 6 of the panel.

The front face 6 is provided with regularly spaced rectangular perforations 8 which define a grid of squares over its extent. At the edges of the face 6, the grid perforations extend into a series of rather wider elongate perforations directed along the free edges so that T-slots 10 are formed. In the flanges and spaced away from these edges are two series of apertures 12, 14 of round and elongate form respectively. The elongate apertures have the same pitch as the grid module established by the perforations 8 and are located so that their centres are equidistantly staggered from adjacent grid lines running transversely to the extent of the apertures and are therefore similarly staggered between adjacent T-slots 10. The round apertures have a pitch equal to half the grid module, alternate apertures being in line with the elongate apertures and the T-slots respectively.

The function of the apertures 12, 14 is to provide for the attachment of the linear indicators in the form of stretchable cords or bands, the circular apertures being intended for use with cords or bands of round section and the rectangular apertures with those of flat section. Each cord is attached between opposed flanges of the panel as indicated by the cord 20 in FIG. 3. The cord has an unstressed length slightly less than the distance between its associated pair of flanges and is preferably capable of extension to more than twice its unstressed length so that it can extend across substantially the whole width of the face 6.

When a cord is passed through one of the apertures 12 that are in line with the T-slots 10, there is the danger that it will bind in the T-slot when it is drawn over the front face of the panel and to preclude this possibility a masking piece 18 is provided to be secured along the panel flange. The masking piece is a flat metal strip equal in width to the flange and having corresponding series of apertures 12, 14. Its forward edge 19 is uninterrupted, unlike the junction of the panel flange and front face, so that it forms a bearing edge holding a cord or band clear of the T-slots. Such masking pieces can be applied to a plurality of the flanges if required.

FIG. 1 of the drawings illustrates how bolts 15 are used to secure a blanking piece to a panel flange. It will be noted that of the series of apertures 12, certain widely spaced apertures 12a are elongated in a direction perpendicular to the extent of the series and these are used to receive the bolts 15. By this means all the apertures are still available for cords or bands if required. It may alternatively be preferred to provide holes for the bolts 15 spaced from the apertures 12. The bolts 15 can also be used for the assembly of two or more panels in known manner to provide an extended display surface and preferably the location of the apertures 12a is matched to that of the connecting bolt holes of prior display panels of the kind described so that they can form a combined display surface with the new panels.

It is to be noted that, since the rows of apertures formed in the masking piece 18 are identical to those in the panel flanges, the same press tool can be used for their formation.

As will be apparent from FIGS. 1 and 2, both the side flanges and the top and bottom flanges of the panel can carry signal cords so that horizontal, vertical and obliquely inclined linear signals may be displayed. Cutout portions 16 in the flanges at the corners of the panels permit the panel to be hung vertically from a mounting rail of known form but at all times the linear signals are held clear of the rear edges of the flanges so that they cannot bind on a rear supporting surface.

In the arrangement shown in FIGS. 4 and 5, respective auxiliary panels 30 are mounted on laterally opposite sides of a main display panel 32. Each auxiliary panel has side flanges 34 in which, preferably, are two series of apertures 36, 38 which correspond in spacing and location to the apertures 12, 14 illustrated in FIGS. 1 and 2. Each auxiliary panel front face has a grid of rather different form from that on the main panel and including circular and rectangular apertures 40, 42. In fact, the pattern of these alternating rows of apertures is identical to that of the flange apertures. This has the immediate advantage that a relatively simple set of punch dies can repeat the same aperture pattern to form all the apertures of an auxiliary panel. Such an arrangement may also be provided on a main panel but it is alternatively possible to provide the two series of rectangular perforations 8 on the auxiliary panels if desired.

Similarly to the first-described example, elongated apertures 36a are provided at some of the stations of the row of apertures 36 to allow bolted connection of the auxiliary panels to the main panel.

A particular feature of the new auxiliary panels is that they may also be attached to previously known panels, in which the perforation series 12, 14 are not present, so that the functions of these panels can be increased to include linear signal displays. It has been usual to supply the flanges of these earlier panels with holes, indicated at 44 on the only visible flange of the panel 32 in FIG. 4, for bolts to join a plurality of panels to extend the display surface if desired and the apertures 36a are arranged to mate with these holes. FIG. 5 illustrates this case and shows that the cords or bands must then pass behind the rear edges of the main panel flanges. To keep these cords or bands clear of a rear support surface 45, spacer pieces 46 may be secured in any conventional manner to any flange of the main or auxiliary panels.

While FIGS. 4 and 5 show two auxiliary panels attached to opposite sides of the main panel, this may only be necessary where endless band linear signals are to be used. In other cases, where the signals can terminate short of an edge of the main panel, provided such apertures as the known T-slots 10 are present in the main panel these may be used to anchor the rear end of a signal which is then drawn across the rear of the main panel to appear on its face after passing through an aperture of the signal mounting means in the auxiliary panel. It is clear, however, that if a linear signal is continued across the entire width of the front face of the main panel (i.e. an endless band) it would bind in the T-slot into which it must then be inserted and therefore be adjustable only with difficulty.

It is also possible to provide auxiliary panels similar to those shown in FIGS. 4 and 5 at the top and/or bottom edges of a main panel and where this is done it may be desirable to include supplementary rails for the purpose of mounting an assembly upon a wall or other support surface. Thus, such supplementary rails could be analogous to the mounting means shown in British patent specifications Nos. 730,158 and 806018. Also, a backing plate such as is described in British patent specification No. 730,158 can be provided on the rear of a panel according to the present invention.

FIGS. 4 and 5 illustrate a flanged main panel and therefore channel-form auxiliary panels have been shown in conjunction with it, their inner flanges being attached to the flanges of the main panel. Where the main panel has no such flanges for the attachment of an auxiliary panel, these latter items may be of angular section.

With reference to the auxiliary panel grid pattern shown in FIG. 4, it will be appreciated that, particularly if extended to the main panel, as indicated at 40a in FIG. 1, the circular apertures 40 can be used to receive pegs or like attachments either as indicators or for the attachment of linear signals.

It will be apparent that many variations of the display panels are possible within the scope of the present invention. Thus, the grid perforations may be further modified by variation of shape. Also, while flanged panels of relatively thin sheet material are shown, thicker panels, e.g. of pegboard or wood can be used in conjunction with the auxiliary panels.

The anchorage of the cords or bands to the front face of a display panel can be performed in various ways. For example, a hooked form for anchorage, as indicated in FIG. 3 at 21, can be provided to engage in apertures of the front face as desired. Alternatively, ring-form terminal members may be arranged to engage pins, pegs or like projections from said front face, said projections being mounted in the grid perforations or with the circular perforations referred to above.

One particular form of hooked anchor piece illustrated to an enlarged scale in FIGS. 6 and 7 comprises a plane, rectangular main body 61 which may present a coloured face as a signal upon the grid. From one side of the body, a tapered tag 62 extends to engage in a grid perforation. At the opposite side of the body 61 is a cord-engaging return portion 64 having an elongate slot 65 through which a cord or band is passed. If desired, the terminal region 67 of the portion 64 can be omitted so that the ends 66 form a pair of spaced hooks or prongs to engage the cord or band. The thickness of the tag 62 is preferably not more than half the thickness of the grid perforations so as to allow two tags to be mounted back-to-back in the same perforation. The tag width widens at its inner end to a dimension slightly larger than that of a grid perforation since it is found that this allows the tag to be withdrawn more easily.

The connection of a cord or band to the device can be made in various ways. In the case of a thin elastic cord it is easy to loop or knot this through the slot 65 shown in FIG. 8. FIG. 9 shows a flat band 70 provided with a terminal protuberance in the form of a sheet metal toggle piece 72 which is crimped onto the band so that teeth 74 of the toggle piece grip the elastic material. FIG. 10 shows how this is then attached to the anchor piece by passing the toggle piece through the slot 65.

FIG. 11 shows how the flat band is carried from the front face of the panel through a slot 14 and FIG. 12 shows how the T-slots 10 can be used to advantage in anchoring the other end of the band. In this illustration to toggle piece 72 is drawn through a T-slot from the rear of the panel and is then inserted in a slot 14 where it anchors the band 70 but is hidden within the flange. This procedure does not reduce the number of apertures available for linear signals and is of particular advantage in allowing a further panel to be connected to the flange concerned without a wide gap being left between the panels. FIG. 5 shows how a similar procedure can be used for a round cord looped onto a termianl protuberance in the form of a continuous or split ring 76, the ring being anchored within the flange behind a round aperture 12. If a continuous ring is used, the cord may be attached in a similar manner to that shown in FIG. 8.

It is sometimes required to form a linear signal as an endless band of two different colours. Such a band will employ two half-length elements of the chosen colours and if of sufficiently small cross-section a neat join on the front of the panel can be made by simply looping them together. To hold their hidden ends together in a manner that allows the band to be readily removed from the panel when required, a split ring may be used. Such a ring 78 is shown in FIG. 14 connecting round cord elements, 80, 82. For larger cross-sections, in particular, flat, elastic elements, FIG. 15 shows how a neat join between the different elements 84, 86 can be obtained by a crimped attachment 88 similar to the toggle piece 72 of FIG. 9. At the rear of the panel, as FIG. 16 shows, a split ring 78 is used with further crimped terminal attachments to detachably join the elements.

It will be appreciated that these terminal protuberances also permit linear signals to be mounted in a display so as to terminate at points within the area of the auxiliary panels where the appropriate anchorage will be secured to the signal after it has been inserted in a grid perforation. A similar effect may also be achieved by cords or bands brought to the front of the auxiliary panel from the rear attachment point through the appropriate perforation in the panel grid and it is therefore desirable to correlate the cros-sections of the perforations and the cords to permit this form of display.

It is known to use with display panels of the kind described, signal elements which are cut from a resilient sheet of material and which have a main portion substantially filling one or more grid squares, tabs on two opposite edges of this portion being insertable in adjacent grid perforations to retain the signal element in position. It is a disadvantage of such signal elements, however, that their tabs do not hold them very securely in place and if the signals of a display fall out unnoticed the result can be serious.

Such risk of displacement is increased when the present invention is employed and when such a signal element is to be set on a grid square through which a linear signal already runs since this can itself tend to urge the elements tabs from the grid perforations.

In combination with the means of the present invention there is therefore preferably provided an improved signal element in which the opposed tabs now have recessed regions adjacent their junctions with the main surface of the body or face portion of the element. It is found that such an arrangement, if suitably correlated to the size of the surface slots, is able to inhibit and avert displacement in that a wedging action results if a displacing force acts to pull a free edge of the body portion away from the display surface.

An example of the new element is shown in FIG. 17. It is formed from a flexible sheet material and comprises rectangular main body portion 110 from opposite sides of which project the tabs 112 in the form of symmetrical bulbous lobes so that there is a recessed edge 114 on each side of each tab at its junction with the body. The lobes can be inserted in parallel, opposed perforations of the grid of a display surface so that the body portion 110 substantially fills the grid space between said perforations.

The maximum width of the lobes may be slightly less than the width of the perforations so that they can be inserted in the perforations quite freely or, since the material of the member is flexible, this width can be slightly larger than the perforation width. In either case however, if a displacing force is applied to either of the free edges 116 of the main body portion which would tend to pivot the signal element about its other free edge away from the surface on which it is mounted, the opposite recessed edges 114 of the tabs tend to form a pivot for such movement with a result that the lobes jam in their perforations. Such a pivoting force would therefore not be able to remove these signal elements. If, on the other hand, the opposed free edges of the element are gripped between thumb and forefinger and raised together, the element can be easily withdrawn from the display surface. It will be clear that such a balanced action is hardly likely to occur inadvertently.

A requirement in certain forms of signal display is the ability to bring one linear signal to a termination at a grid position on the display surface through which another signal already runs. An advantage of the novel signal element just described is that it can be adapted to meet this function. FIGS. 18 and 19 show alternative adapted elements in the form of bridge pieces which can be used for such situations, the two designs being similar to each other save that in FIG. 18 an elastically flexible material has been employed whereas the example in FIG. 19 uses a rigid, preformed material.

These bridge pieces are in many ways similar to the novel elements described with reference to FIG. 17 and those parts already referred to are indicated by the same reference numerals. However, the body portion of each bridge piece carries an elongated slot 118 extending towards the tabs 112. Also, since the body portion may not need to be prominently visible in certain applications, it may be reduced in area as indicated by the broken lines 117.

FIG. 20 exemplifies the use of the bridge pieces on a display surface. Along one line of the grid, a first coloured band 120 runs to a terminal position formed by a hooked anchor piece 122 to which it is secured. Over this first signal a band 124 of a different colour runs for part of the distance of the first to a position where a bridge piece 126 has been mounted on the grid to straddle the lower band 120. Here the upper band is attached by insertion of its toggle piece termination 128 through the bridge piece slot. On an immediately adjacent grid line there is shown a further band 130 similarly mounted over an endless band comprising differently coloured portions 132, 134 joined by crimping 136.

A feature of the assembly illustrated is that the adjacent regions of the two bridge pieces have their lobes inserted in the same grid perforation. With previously known tab signals this would be an undesirable practice since the signals would then be all the more likely to become detached. Because of the self-locking tendency of the lobes of the bridge pieces this danger no longer exists. This, of course, exemplifies a further advantage of the self-locking signal as illustrated in FIG. 17 whether it is used with or without linear signals.

In the alternative arrangement shown in FIGS. 21 and 22, main body portion 121 has opposed tabs 127 which each have a lug 123 extending from an asymmetrical recessed edge 129. The purpose of the arrangement illustrated is to permit a signal element to be withdrawn when a displacing force is applied to free edge 125a but to maintain it in its mounted position when the force is applied to the opposite edge 125b. It will be clear from FIG. 22 that the effective width of the tabs 127 is substantially constant over their extent as measured radially from the edge 125a and is less than the corresponding dimension of the grid perforation in which is seated the tab, but the lug 123 offers an abutment of increased width when pivoting takes place about the opposite edge 125b. This example is illustrated with a slot 126 in its body portion analogously to the slot 118 shown in the example of FIG. 19.

The further form of signal shown in FIGS. 23 and 24 is made of relatively stiff material such as sheet metal and comprises a rectangular main body 142 from opposite sides of which project tabs 144 of lobe form similar to those shown in FIGS. 17 to 19. The other two sides of the body have margins 146 which are each curved under the main region of the body so that their terminal edges 148 are spaced therefrom. Intermediate the curvature of each margin a slot 150 is formed with its major dimension extending transversely between the tabs and its minor dimension extending transversely to the plane of the main body portion.

The drawing shows how both slots can be used to receive toggle piece terminals such as 152 on respective signal bands 154, 156. It will be appreciated, however, that the device can also form a unit signal, the exposed face of the body 142 being given a required colouring or other marking. It will be seen that the slots 150 are clear of said face and therefore allow a visual effect similar to that of an unslotted element.

The alternative element shown in FIG. 25 is again of stiff metal and its body portion is similar to that of the element in FIGS. 23 and 24, the same reference numbers indicating the same parts. The tabs 160 are now of hooked form comprising a root portion 162 and a lug or terminal portion 164, so that a recessed region 166 is defined between the lug and the body portion similarly to the recessed edge 129 in FIGS. 21 and 22. In the present example, the width of the lug is slightly less than the corresponding slot dimension in the display surface, thus facilitating removal of the element when required, while the root portions 162 are offset towards that end of the body portion to which the lugs 164 project so that when a signal band applies a tension to that end, the element is held centrally of the grid unit in which it is seated.

The element is also characterised by the incorporation of an indicator strip including a flat, coloured signal band 170 which is looped at both ends, one end being secured to one slot 150 of the element and the other end having a resilient cord 172 of the strip attached by a toggle piece 174 on which the cord is itself looped. A second toggle piece 174 attached to the other end of the cord permits it to be secured to an aperture at an edge of a display panel. The cord is then located behind the display surface and the band 170 brought to the front of the surface at its opposite edge region. As a longer or shorter signal is required, so the cord 172 is stretched or allowed to contract, the element anchoring the free end of the band 170 at the required distance across the front of the display surface.

In using strip-form signals, it may sometimes be required for one strip to overlie another. It will be appreciated that two signals having anchoring elements as shown in FIG. 25 can be so arranged if the elements are not required to terminate at the same position in the display panel grid. In order to allow such co-termination of two linear signals, there may be employed, in combination with a signal as shown in FIG. 25, a signal in the form of an endless band, as illustrated in FIG. 26, which will extend completely around the display panel.

The signal comprises two strip-form portions, 180, 182, which may be differently coloured or of which one may be transparent. The portions are joined together at one end 184 and at further ends are connected by a hairspring 186. The hairspring is kept at the rear of the panel in use and the strips 180, 182 are each equal or nearly equal in length to the span of the display surface over which they extend. Thus, the band can be adjusted to bring the junction 184 to any desired position along said span to indicate a signal termination at that position and the signal band shown in FIG. 25 can overlie the endless band to be anchored at any position regardless of the termination position of the endless band signal as indicated by the junction 184.

From the foregoing description it will be apparent that the invention permits considerable flexibility in the use and functon of a display panel. Horizontal and vertical bar charts can be formed and the anchor piece shown in FIGS. 6 and 7 can also be used intermediate the length of a stretched cord to deflect it from a rectilinear setting and thus produce a line graph through any arbitrary series of positions on the grid.

It may be pointed out that conventional tabbed signal elements and like indicators previously associated with panels of the kind described may continue to be used with the improved linear signal mounting means and that it is also possible to arrange that a plurality of panels can be secured to each other to extend the display area in such a way that the panels may be detached from each other without disturbing the signals already mounted upon them.

What I claim and desire to secure by Letters Patent is:

1. In a panel display of the kind having a frontal display surface and at least one rectilinear side forming a boundary of the display surface from which cords or bands can extend across the display surface to form linear signals on said surface, the frontal display surface of said panel display being provided with spaced perforations or slots arranged in lines forming a grid pattern with some of said lines extending away from said one side, and at least one flange extending rearwardly from the frontal display surface along said one side, the improvement wherein a series of apertures for receiving signal cords or bands is disposed in the body of the flange and rearwardly spaced away from the frontal display surface, said series of apertures comprising at least two rows running parallel to the display surface, and wherein the apertures of said rows are disposed relative to the grid pattern so that at least one aperture in each of said rows is located opposite each space between grid lines extending away from said one side of the frontal display surface.

2. A panel display according to claim 1, wherein said series of apertures includes at least two rows of apertures of different form and differently spaced from said frontal display surface, the apertures of a first of the rows being rounded and the apertures of a second of the rows being elongate with their major axes directed along the row.

3. A panel display according to claim 2, wherein the pitch of the apertures of each of the different forms is not greater than the module of the grid pattern.

4. Means according to claim 2, wherein the rounded apertures have a pitch equal to half the module of the grid pattern.

5. A panel display according to claim 1, wherein the cords or bands are arranged to pass behind the rear of the display panel, and spacing means secured to the panel display and projecting from the rear thereof for holding the cords or bands clear of a rear support plane for the panel display.

6. A panel display according to claim 1, including apertures in the front face of the panel display having extensions extending into the junction of said face with said rearwardly directed flange, a masking piece for said flange, and masking piece being in the form of a strip bearing a corresponding series of apertures to those of the flange but having an uninterrupted front edge that lies over said front face aperture extensions.

7. A panel display according to claim 1, including a main panel on which said frontal display surface is provided and an auxiliary panel, said auxiliary panel comprising a front surface and attachment means securing said auxiliary panel to the main panel such that said front surface extends from an edge of said frontal display surface, said at least one flange being provided on said auxiliary panel whereby said series of said apertures are disposed upon the auxiliary panel parallel to said side of the display surface grid.

8. A panel display according to claim 7, wherein a parallel series of corresponding apertures are provided in said front surface and said flange of the auxiliary panel.

9. A panel display according to claim 7, including a second auxiliary panel similar to said auxiliary panel and secured to the main panel having said frontal display surface, the auxiliary panels being secured to opposite sides of said main panel so that linear signal cords or bands can extend between apertures of the series of apertures in the two auxiliary panels.

10. A panel display according to claim 1, including a signal piece comprising a central body portion and a pair of tabs projecting respectively from opposite sides of said body portion for insertion in spaced grid perforations, a recessed region provided on an edge of each tab adjacent the body portion, and wherein said signal piece includes an anchorage for a signal cord or band.

11. A panel display according to claim 10, wherein the body portion of said signal piece comprises at least one marginal portion extending transversely between the tabs, said marginal portion being folded under the main part of the body portion and containing a slot forming said anchorage in the region of its fold.

12. A panel display according to claim 10, wherein said tabs are of hooked form comprising a root portion extending downwardly from the body portion of the signal piece and a terminal portion extending transversely to one side of the root portion and spaced from the body portion to define said recessed region.

13. A panel display according to claim 1, including cords or bands on the display surface each arranged to be stretched to at least twice their unstressed length.

14. A panel display according to claim 1, including a signal band arranged to form an endless strip across the display surface, said band comprising two differently colored band lengths joined end to end, said band further comprising a resilient element, said band lengths having respective ends remote from said joined ends linked by said resilient element.

15. Visual information display means comprising, in combination, a main panel having a rectangular form boundary and within said boundary a frontal display surface provided with spaced perforations or slots in lines forming a grid pattern, respective auxiliary panels of a pair secured at opposite boundaries of the main panel, at least one series of apertures comprising at least two rows running parallel to the adjacent boundary of the main panel but spaced therefrom for receiving signal cords or bands disposed in each auxiliary panel, said apertures being similarly spaced in the respective auxiliary panels and the apertures of each said one series being disposed relative to the grid pattern so that at least one aperture is located opposite each space between grid lines extending away from the adjacent boundary of the main panel, at least one signal band comprising a flat band length providing a visible part of a signal and an elongate resilient element secured by one end to one end of said band length and having a protuberance at its opposite end retaining said opposite end at an aperture in one auxiliary panel, said element being arranged to extend across the rear of the panel and the band length being arranged to pass through an aperture in the opposite auxiliary panel to form a linear signal on the frontal display surface of the main panel, an anchoring element comprising means for disengageable attachment to perforations of said display surface, and means engaging the free end of said band length whereby said element can locate the termination of said signal on the display surface.

16. For use with a display panel having a frontal display surface provided with spaced perforations in the form of a grid, a signal element comprising a central body portion having front and back surfaces, like tabs projecting respectively from opposite sides of the body portion and directly from its back surface for insertion in spaced grid perforations to retain the signal element on the panel surface, respective necked regions being provided on each tab at its junction with the central body portion, the maximum width of each tab beyond said necked region being similar to the parallel dimension of the grid perforation into which it is to be inserted.

17. A signal element according to claim 16, including at least one marginal portion at a side of the main region of the body portion and extending transversely between said tabs, said marginal portion being folded under the back surface of the main region of the body portion, a slot provided in said marginal portion at the region of said fold to receive an end of a linear signal cord or band and provide an attachment therefor.

18. An element according to claim 17, wherein the body portion is generally rectangular and respective ones of said slotted marginal portions are provided at opposite sides of the main region.

19. An element according to claim 16, wherein each tab is in the form of a hook, the maximum width of said hook being less than the corresponding dimension of a grid perforation into which it is to be entered.

References Cited

UNITED STATES PATENTS 2,769,553 11/1956 Horton _____ 40—63 X
2,942,364 6/1960 Horton _____ 40—63

FOREIGN PATENTS 1,044,944 6/1953 France.
1,173,786 7/1964 Germany.
754,148 8/1956 Great Britain.
504,191 12/1954 Italy.

EUGENE R. CAPOZIO, Primary Examiner

R. CARTER, Assistant Examiner